US010776983B2

(12) United States Patent
Kulkarni et al.

(10) Patent No.: US 10,776,983 B2
(45) Date of Patent: Sep. 15, 2020

(54) ANALYSIS OF POINT CLOUD DATA USING DEPTH AND TEXTURE MAPS

(71) Applicant: Nvidia Corporation, Santa Clara, CA (US)

(72) Inventors: Ishwar Kulkarni, Santa Clara, CA (US); Ibrahim Eden, Redmond, WA (US); Michael Kroepfl, Redmond, WA (US); David Nister, Redmond, WA (US)

(73) Assignee: Nvidia Corporation, Santa Clara, CA (US)

( * ) Notice: Subject to any disclaimer, the term of this patent is extended or adjusted under 35 U.S.C. 154(b) by 75 days.

(21) Appl. No.: 16/051,263

(22) Filed: Jul. 31, 2018

(65) Prior Publication Data

US 2019/0266736 A1    Aug. 29, 2019

Related U.S. Application Data

(60) Provisional application No. 62/636,117, filed on Feb. 27, 2018.

(51) Int. Cl.
*G01S 17/58* (2006.01)
*G01S 17/89* (2020.01)
(Continued)

(52) U.S. Cl.
CPC .............. *G06T 15/04* (2013.01); *G01S 17/89* (2013.01); *G06K 9/00791* (2013.01);
(Continued)

(58) Field of Classification Search
None
See application file for complete search history.

(56) References Cited

U.S. PATENT DOCUMENTS

| 9,037,396 B2* | 5/2015 | Pack | G01C 21/30 |
| | | | 701/409 |
| 9,060,117 B2* | 6/2015 | Bryll | H04N 5/235 |

(Continued)

OTHER PUBLICATIONS

Chen, et al.; "Transforming a 3-D LiDAR Point Cloud Into a 2-D Dense Depth Map Through a Parameter Self-Adaptive Framework"; IEEE Transactions on Intelligent Transportation Systems; 1524-9050; Jun. 1, 2016; pp. 1-12.

(Continued)

*Primary Examiner* — Soo Shin

(57) ABSTRACT

Various types of systems or technologies can be used to collect data in a 3D space. For example, LiDAR (light detection and ranging) and RADAR (radio detection and ranging) systems are commonly used to generate point cloud data for 3D space around vehicles, for such functions as localization, mapping, and tracking. This disclosure provides improvements for processing the point cloud data that has been collected. The processing improvements include analyzing point cloud data using trajectory equations, depth maps, and texture maps. The processing improvements also include representing the point cloud data by a two dimensional depth map or a texture map and using the depth map or texture map to provide object motion, obstacle detection, freespace detection, and landmark detection for an area surrounding a vehicle.

25 Claims, 6 Drawing Sheets

(51) Int. Cl.
*G01S 17/931* (2020.01)
*G01K 9/00* (2006.01)
*G06T 11/00* (2006.01)
*G06T 15/04* (2011.01)
*G06T 7/20* (2017.01)
*G06T 7/30* (2017.01)
*G06T 7/521* (2017.01)
*G06K 9/00* (2006.01)

(52) U.S. Cl.
CPC ..... *G06K 9/00805* (2013.01); *G06K 9/00818* (2013.01); *G06K 9/00825* (2013.01); *G06T 7/30* (2017.01); *G06T 7/521* (2017.01); *G06T 11/001* (2013.01); *G06T 2207/10028* (2013.01); *G06T 2207/30241* (2013.01)

(56) References Cited

U.S. PATENT DOCUMENTS

| | | | |
|---|---|---|---|
| 9,177,229 B2 * | 11/2015 | Merler | G06T 7/277 |
| 9,373,190 B2 | 6/2016 | Wei et al. | |
| 9,465,997 B2 * | 10/2016 | Tu | G06K 9/00771 |
| 9,619,691 B2 * | 4/2017 | Pang | G06K 9/00208 |
| 9,646,410 B2 | 5/2017 | Collet Romea et al. | |
| 10,108,867 B1 * | 10/2018 | Vallespi-Gonzalez | G01S 17/86 |
| 2005/0015201 A1 | 1/2005 | Fields et al. | |
| 2013/0100114 A1 | 4/2013 | Lynch | |
| 2013/0101175 A1 | 4/2013 | Lynch | |
| 2016/0275667 A1 * | 9/2016 | Modica | G08G 1/123 |
| 2016/0321838 A1 * | 11/2016 | Barone | G06T 5/50 |
| 2017/0052032 A1 | 2/2017 | Miksa et al. | |
| 2017/0061632 A1 | 3/2017 | Lindner et al. | |
| 2018/0189927 A1 | 7/2018 | Watanabe et al. | |
| 2018/0364717 A1 | 12/2018 | Douillard et al. | |
| 2019/0090984 A1 | 3/2019 | Martz et al. | |
| 2019/0204423 A1 * | 7/2019 | O'Keeffe | G01S 7/4817 |
| 2019/0258251 A1 * | 8/2019 | Ditty | G06K 9/00805 |

OTHER PUBLICATIONS

Elbaz, et al.; "3D Point Cloud Registration for Localization using a Deep Neural Network Auto-Encoder"; CVF; Technion—Israel Institute of Technology; undated; pp. 4631-4640.

Wang, et al.; A new Upsampling Method for Mobile LiDAR Data; NAVTEQ Corporation and McGill University; undated; pp. 17-24.

Low; "Linear Least-Squares Optimization for Point-to-Plane ICP Surface Registration"; ResearchGate; Technical Report TR04-004; University of North Carolina at Chapel Hill; Feb. 2004; https://www.researchgate.net/publication/228571031; pp. 1-3.

* cited by examiner

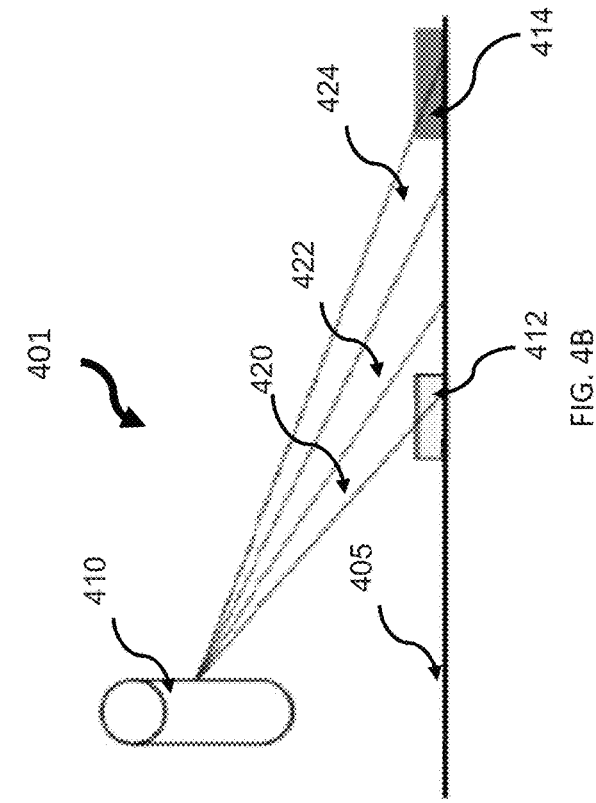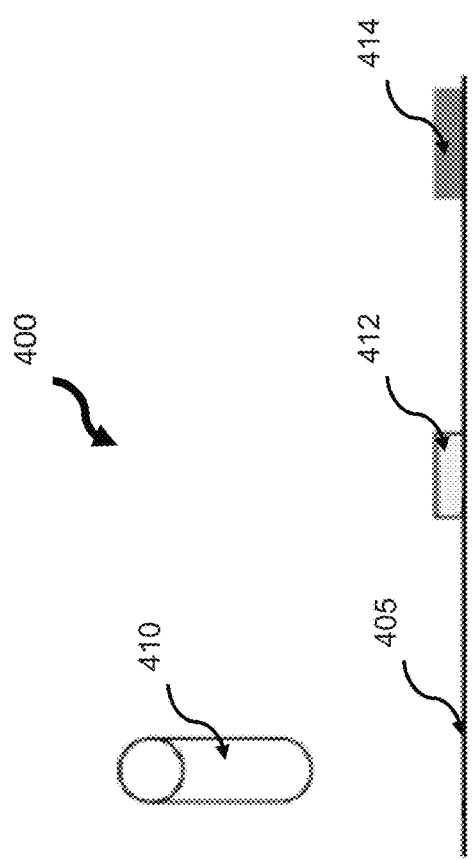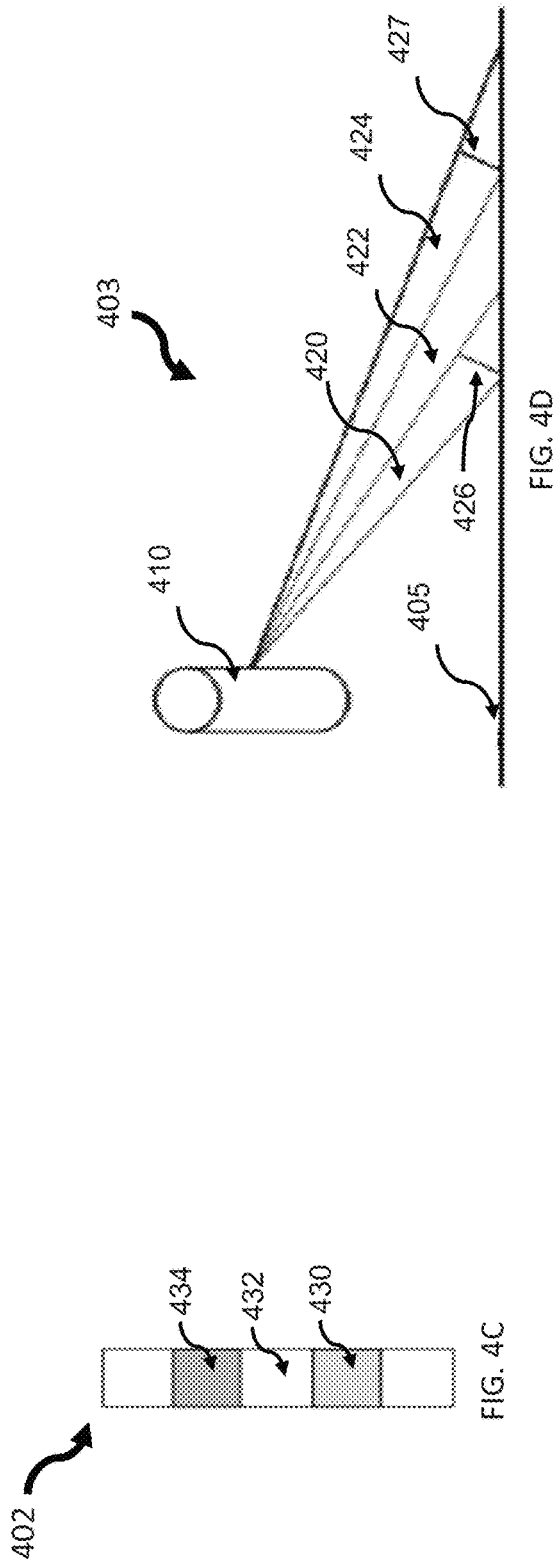

ANALYSIS OF POINT CLOUD DATA USING DEPTH AND TEXTURE MAPS

CROSS-REFERENCE TO RELATED APPLICATION

This application claims the benefit of U.S. Provisional Application Ser. No. 62/636,117, filed by Kulkarni, et al. on Feb. 27, 2018, entitled "TEMPORAL FUSION AND PLANARIZATION FOR ITERATIVE CLOSEST POINT IN AUTOMOTIVE LIDAR APPLICATIONS," commonly assigned with this application and incorporated herein by reference.

TECHNICAL FIELD

This application is directed, in general, to analyzing clouds of points, such as data collected by a light detection and ranging (LiDAR) system, and, more specifically, to transforming point cloud data to a depth map and texture map.

BACKGROUND

The iterative closest point (ICP) algorithm is a well-known approach to solving for pose-differences between clouds of points. It is used as an approach to transform LiDAR information in autonomous vehicles, to provide localization, tracking, and other parameters. ICP algorithms utilize the construct of nearest neighbors for identifying groups of points. A common technique utilized to implement the ICP algorithm is the k-d tree approach. Processing LiDAR data for real-time localization has proven difficult, in part because improvements in LiDAR resolution have been introduced, causing an increase in the amount of data needing to be processed. Improvements in hardware capabilities and computing processing speeds may not overcome the large quantities of data being collected within a prescribed time period. Some current LiDAR arrays can generate 220,000 points of data per rotation and operate at 10 rotations per second, e.g., 2.2 million data points per second that need to be processed in real-time.

SUMMARY

One aspect of the disclosure provides a method of analyzing data points in a point cloud system. One aspect of the method includes: (1) determining nearest neighbor data points for each of received data points, wherein the data points are a three dimensional (3D) point representation, and (2) estimating trajectory equations utilizing the nearest neighbor data points and the received data points.

Another aspect of the disclosure provides a point cloud data analysis system to generate geometric space parameters. One aspect of the system includes: (1) a receiver, operable to receive data points for a 3D point representation of a geometric space surrounding a vehicle, and (2) a graphics processing unit (GPU) operable to transform the data points to at least one of a depth map and a texture map, and to generate geometric space parameters.

A third aspect of the disclosure provides for a computer program product having a series of operating instructions stored on a non-transitory computer-readable medium that directs a data processing apparatus, when executed thereby, to perform operations. In one aspect, the computer program product includes: (1) receiving data points, at a periodic interval, wherein the data points are a 3D point representation of part of a geometric space surrounding a vehicle, (2) performing nearest neighbor analysis for each of the received data points, and (3) estimating trajectory equations utilizing the nearest neighbor analysis.

A fourth aspect of the disclosure provides for a method of storing 3D sensor ranging information. In one aspect, the method includes (1) collecting 3D data points employing a detection and ranging sensor, and (2) storing said collected 3D data points as a two dimensional (2D) depth map.

BRIEF DESCRIPTION

Reference is now made to the following descriptions taken in conjunction with the accompanying drawings, in which.

Figure 5:
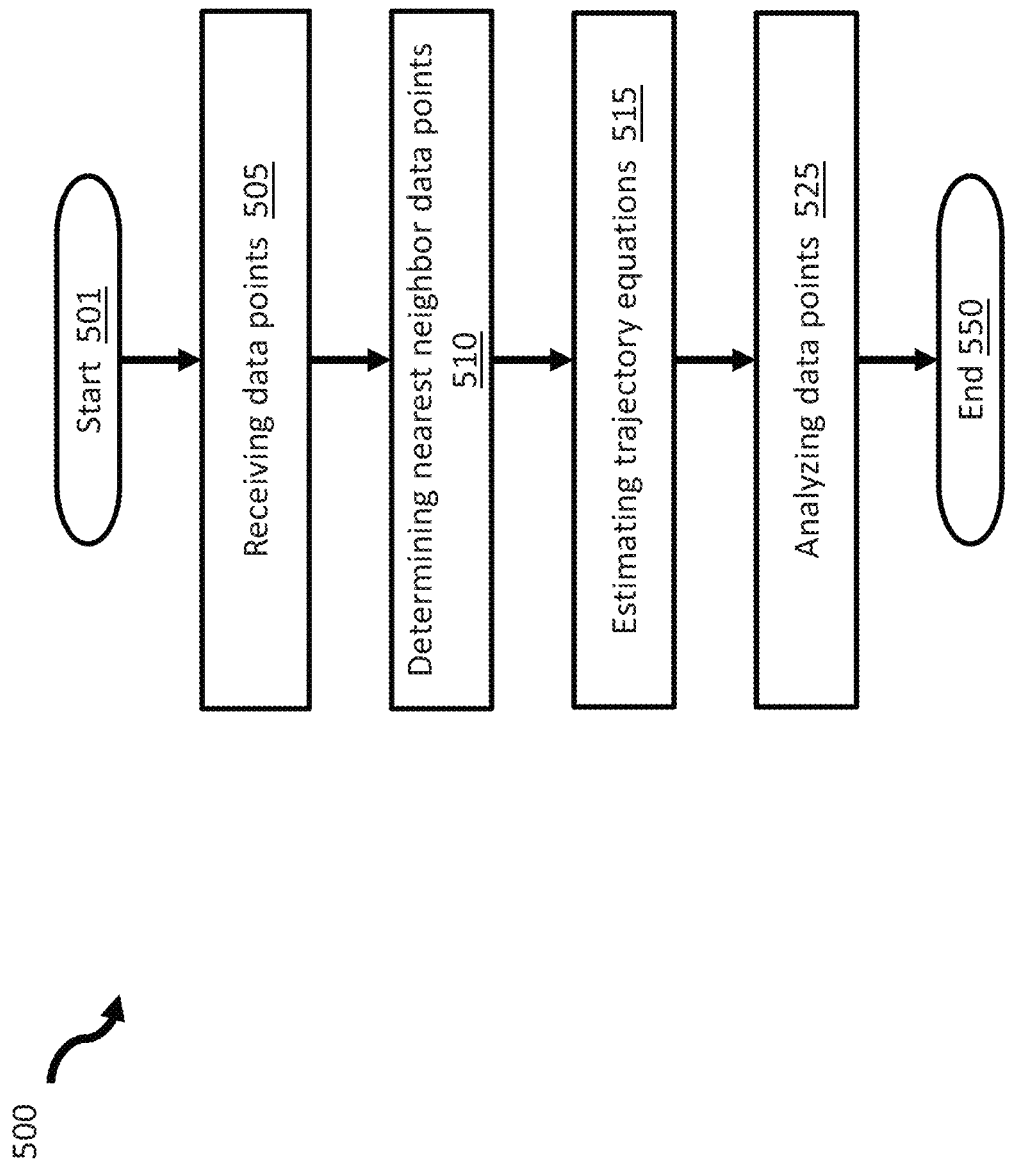
Figure 6:
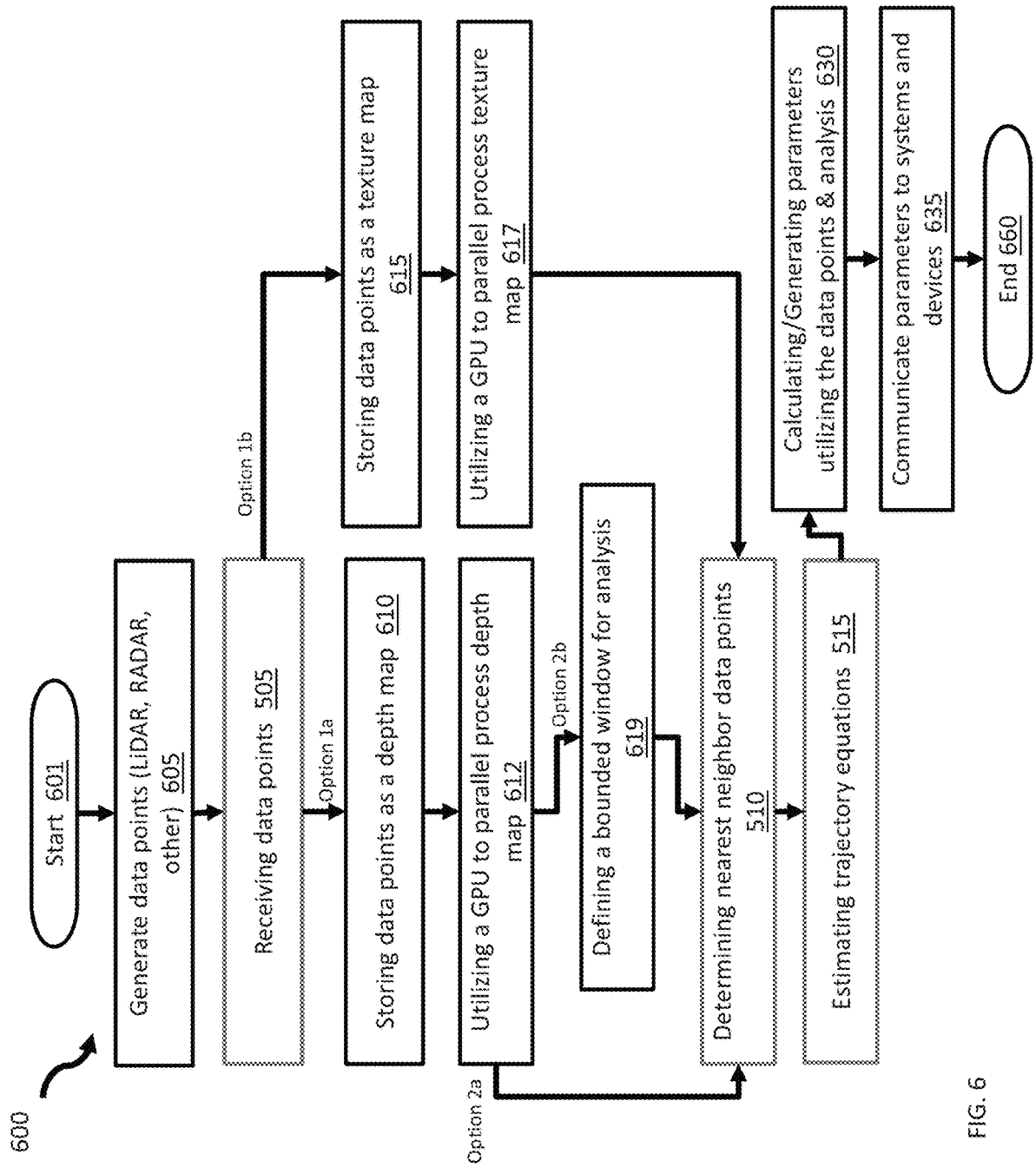

FIGS. 4A, 4B, 4C, and 4D are illustrations of diagrams of an example of depth map noise depiction;

FIG. 5 is an illustration of a flow diagram of an example method for analyzing collected geometric space data points using a two dimensional depth map; and FIG. 6 is an illustration of a flow diagram of an example method, building on FIG. 5, to calculate geometric space parameters.

DETAILED DESCRIPTION

Figure 1:
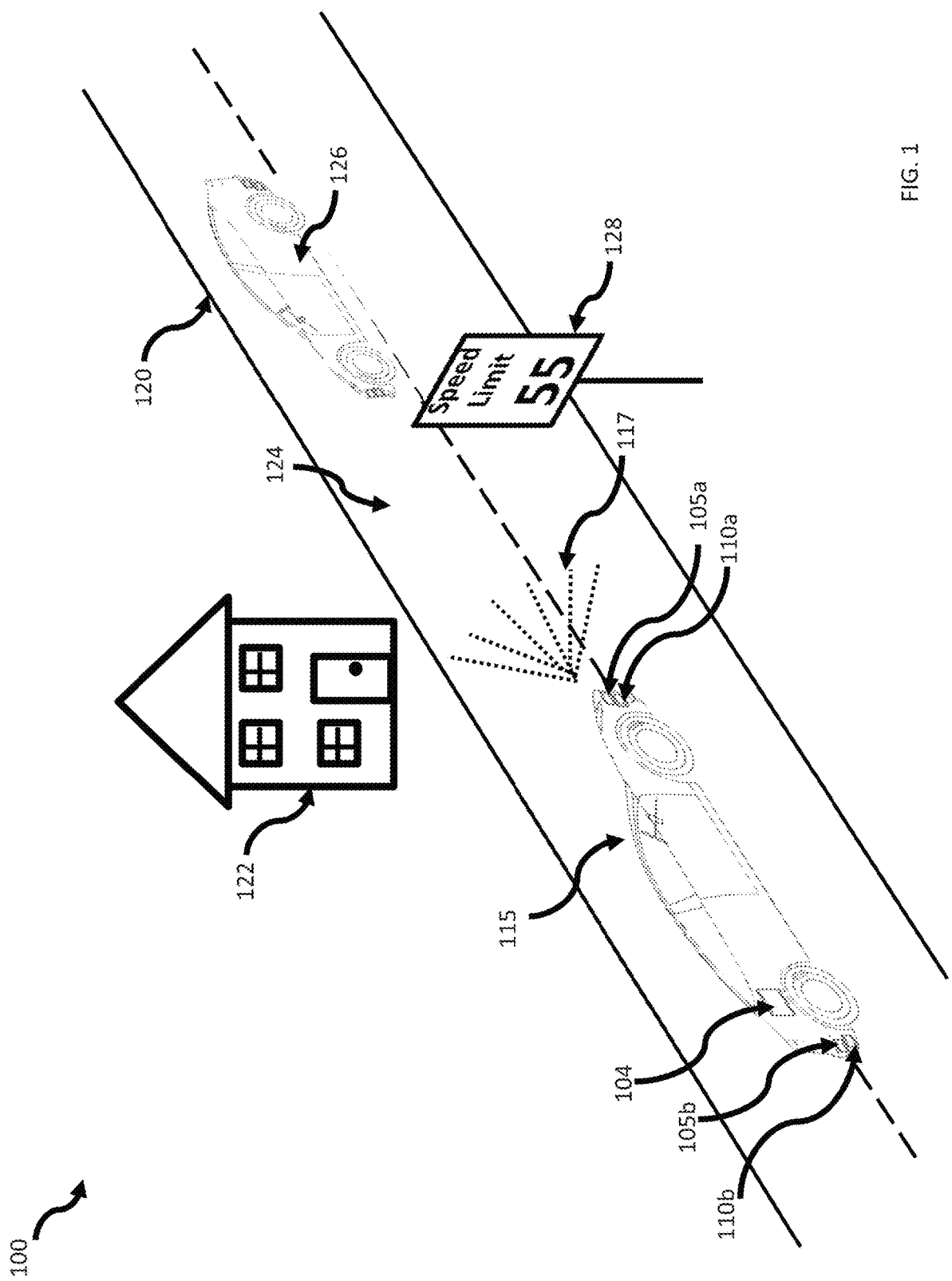
FIG. 1 is an illustration of a diagram of an example autonomous operated vehicle in a real world environment.

In the self-driving, e.g., autonomous or semi-autonomous, vehicle industry, the examination of a vehicle's surrounding environment, or geometric space, can result in a collection of a large amount of three dimensional (3D) data points. The data points can be organized as a cloud of data points, i.e., a point cloud, as the data generally represents the space around the vehicle, i.e., a 3D perspective of the geometric space surrounding, or partially surrounding, a vehicle. The vehicle can be of various types of vehicles that are capable of operating with minimal or no human intervention, for example, without limitation, automobiles, box trucks, trucks with trailers, drones, ATVs, robotics, indoor robots, airplanes, rockets, missiles, spacecraft, and other types of vehicles. An example of such a vehicle is shown in FIG. 1.

Various types of data collection technologies or systems can be used, in different combinations, to periodically collect data in a 3D space. For example, LiDAR (light detection and ranging) and RADAR (radio detection and ranging) systems are commonly used to generate point cloud data for 3D space, whether fully or partially around various kinds of vehicles, for such functions as localization, mapping, and tracking. Some current LiDAR systems can generate 220,000 data points per rotation and can complete 10 rotations per second for a total of 2.2 million data points per second being collected. Other LiDAR systems oscillate rather than rotate. And other LiDAR systems can utilize solid state sensors which can capture an entire point cloud data set at a single time, for a portion of the field of view. In some aspects, a vehicle can have more than one LiDAR system, thereby multiplying the amount of data being collected and processed. In other aspects, different LiDAR systems can be used that vary the rotations per second and can vary the amount of data points collected per rotation.

Optimizations to systems that analyze the collected data points from the point cloud have been introduced. Even with optimizations, some systems may not be able to process all of the data points collected in real time or near real time. In order to be an effective system, the analyzation response time should be fast, such as less than 5 milliseconds. For example, an autonomous or semi-autonomous vehicle operating on a public roadway needs to process updated information quickly to safely determine the appropriate next steps and actions. The actual target response time can vary depending on factors, such as the vehicle type, environment surrounding the vehicle, other system processing needs, and other additional factors.

The methods disclosed herein provide an advantage over existing systems and techniques for processing point cloud data. Using one of the disclosed methods or a combination of the disclosed methods can provide improvements in real-time applications using the collected data. For this application, real-time is intended to mean processing information as each periodic interval portion of data is collected, with a target of processing each periodic interval portion of data in a sub-millisecond range. Real-time is not meant as instantaneous. In an alternative aspect, the sensor data can be collected for one arc of rotation, such as $\frac{1}{10}^{th}$ of 1°, and accumulate the collected data in a memory storage. Once the data in one or more arcs of the rotation is collected, then the system processes the collected data. The collected data can also have motion compensation applied to the data points. The overall system is assumed to continually provide point cloud data at a regular periodic interval for continual processing.

The processing improvements described herein can be used with the analysis and manipulation of point cloud data where an iterative closest point (ICP) algorithm would be beneficial. A point cloud can be a large collection of data points in 3D space. Some points can be further away than others from the origin point. An origin point can be the location of a device that can identify these points in the point cloud. For example, a LiDAR sensor, which can be part of a LiDAR system, can be at the origin point. The LiDAR sensor can be a part of the LiDAR system that can detect reflected signals previously sent out by the LiDAR system. RADAR and other devices can also be used. In addition to being closer or further away from a LiDAR sensor, points in the point cloud can be to the left or right of the LiDAR sensor and above or below the LiDAR sensor.

The points in the point cloud represent a contact with another object. The LiDAR system can send out optical signals and those optical signals can be reflected back to the LiDAR sensor. From that reflected signals, the system can detect a point. The amount of time it takes the signal to bounce back to the LiDAR sensor can be used to determine how far away that object is from the LiDAR sensor. The direction the signal is traveling when it hits the LiDAR sensor can indicate the object's direction relative to the LiDAR system. The point cloud can then be made up of all the reflected signal points received by the LiDAR sensor. The signals can reflect off one or more objects and detect various characteristics of the object. For example, there can be a large portion of the reflected signals being reflected off a road sign close by the LiDAR system. In addition, there can be just a few points of signals reflecting off a ball in the street far in front of the LiDAR system.

In order to interpret the point cloud data that has been collected, the system can apply algorithms or processes to simplify the point cloud data. There is typically too much data collected to analyze every data point in the point cloud in a time frame needed by a moving vehicle to take action, such as avoiding a sudden appearance of an object blocking the vehicle's path. To increase the system's ability to process the data in the point cloud, algorithms and processes are applied to find patterns in the data that can be used to simplify the processing and the number of calculations.

Nearest neighbor is an example of an algorithm that can be used. Nearest neighbor means that for any particular point in the point cloud, identify the other points that are close to that point. Close, in this context, can mean any amount of distance as determined by the system, from 1 or 2 points or more. Typically, for example, the front of the road sign is flat. The data points reflected off the front of the road sign would typically be substantially at the same depth (with some adjustment for the angle of the face of the road sign to the vehicle). In addition, the reflected points would form a polygon shape, such as a rectangle, square, triangle, and octagon (with some adjustments to the shape due to the angle of the face of the road sign to the vehicle). A portion of the points reflected from the road sign can be considered nearest neighbors to each other, since their depth and positioning are close.

This set of reflected points can also be a considered a plane. A plane is a flat shape, in 2D, where a portion of the data points are contained in the plane. Once the plane is identified, the system can use that plane for further analysis of the point cloud. In this disclosure, planes can be used to identify a set of points that are roughly the same distance from the LiDAR system and where those points are relatively close to each other. The distance can vary a little between the points that make up the plane. This is called using a best fit plane, where the plane may not fit perfectly over the data points, but is the plane that fits the best.

Another technique that can be used to process the point cloud data is depth map modeling. A depth map is a way to store the point cloud data where the depth, i.e., the distance from the LiDAR sensor to the object that reflected the signal, can be used as a criterion. The system can concentrate on close points in the point cloud and ignore far points. For example, if there is a second vehicle approaching the LiDAR system, the system can concentrate on that second vehicle (close points) and ignore a pedestrian (far points) standing behind the second vehicle. The point cloud data can be transformed from a 3D view of the points to a 2D view of the points. The depth of each point, which is the dimension that is removed, can be recovered by using the planes that were determined previously. The points can be associated with a plane so the depth information can be determined. Typically, a graphics processing unit (GPU) can perform this work faster than a non specialized processor.

As noted above, another algorithm that can be used to process point cloud data is the ICP. This algorithm can be used to roughly align two point clouds. For example, the LiDAR system can collect two different point clouds at 0.6 seconds apart. The vehicle can be traveling at some speed on a road. Because the vehicle is moving, the two sets of point cloud data may not align. The system needs to know if the system is viewing a new object or the same object that has moved a little, relative to the vehicle. The ICP algorithm can be used to roughly align the data points in the two point clouds so the system can identify the same objects in both point clouds. The system can calculate the distance between matched points; matched points are corresponding points that exist in the first and second point clouds. The system can then calculate if the other object is moving, how fast, and in which direction. From that information, the vehicle can determine what next steps and actions to process.

The above mentioned calculation on how the other object is moving can be relative to how the vehicle with the LiDAR system is moving. For example, a vehicle with the LiDAR system can be stopped or moving, an object, such as a second vehicle, can be stopped or moving. There can be additional objects that may or may not interact with the vehicle as well. For example, the vehicle with the LiDAR system and a second vehicle can be approaching each other head-on or at an angle, they can be moving away from each other at any angle, or they can be traveling in the same direction at the same or different speeds. From the ICP comparisons between two or more point clouds, the system can calculate an estimated path or motion that the object is following, i.e., an estimated trajectory equation for that object. The trajectory equation shows how an object is moving relative to the vehicle with the LiDAR system. The trajectory equation can be used by the LiDAR system by inserting a future time into the equation. The output can then be an estimated position or location of the object at that future time. For example, one second in the future can be used in the trajectory equation to estimate where that object will be positioned one second in the future.

The trajectory of an object can be in any direction, and does not need to be a straight line. For example, a second vehicle may be following a fairly straight line on a road, and a ball can be following a curved path as it falls to the ground. The trajectory of an object, in conjunction with the trajectory of the vehicle, can be used to determine if that object, and the vehicle, will come within a close enough proximity that the vehicle may need to adjust its steps and actions, such as slowing down and/or turning.

Thus, ICP can be used as a process to analyze point cloud data and solving for the above described pose-differences between clouds of points. ICP can be used as an algorithm for interpreting LiDAR collected data points in autonomous vehicles to provide, for example, localization, mapping, trajectory estimation and calculation, dynamic object detection, and free space detection. Trajectory calculations can use relative motion identified, as an object, such as a vehicle, moves from an identified data point plane to another plane. For example, ICP produces the transforms between two point clouds, which when inversed, generates the trajectory that the vehicle traveled.

The process starting from the collected point cloud data, to the trajectory of the vehicle between two periodic instances of time, can follow the steps of: 1) collecting the point cloud data for two periodic instances, 2) fitting planes to local neighborhoods of the point cloud data, 3) initializing the pose using a prior pose, 4) finding the nearest neighbors and geometric planes in each point cloud, 5) computing point to plane cost for each point and nearest neighbor plane, 6) optimizing the pose using Gauss-Newton algorithms to minimize the sum of all squared point to plane errors, 7) estimating trajectory equations from the resulting data set utilizing Jacobian matrices and motion estimations, 8) identifying potential dynamic objects using outlier data points from the trajectory equations, and 9) aggregating the resulting information over multiple periodic instances of collected point cloud data to generate a map of the environment with vector motion identified for the vehicle and surrounding objects. The aggregating can be used to provide the trajectory of a vehicle, for example over 25-50 meters of travel.

One of the traditional characteristics of ICP algorithms is that they involve finding nearest neighbors for individual points in a point cloud. Tree based, prevalently k-d tree, data structures are used to traverse the data. K-d trees have a O( ) (Big O notation) complexity of O(n·log n) for point cloud data of size n. The tree based traversal can be computationally complex due to complex, non-contiguous, and non-consistent data access patterns. Various refinements and optimizations have been used in different applications, where the intention can be to decrease the time to traverse the tree. However, it remains a high time-consuming portion of the standard ICP algorithm.

The k-d tree methodology is a diversely branching algorithm and so is not well suited for certain hardware characteristics such as the parallel processing capability of a GPU. This disclosure presents processes that perform the nearest neighbor algorithm in such a way as to be able to take advantage of the parallel processing techniques available in GPUs thereby providing a solution with a faster overall processing time than existing solutions.

Rather than using a k-d tree or another branching algorithm, the approaches described herein can map the point cloud data into a depth map. In so doing, the nearest neighbor processing step is simplified. The point cloud data can be represented in a two dimensional (2D) arrangement with the useful property that proximity in the 2D grid corresponds to nearness in the 3D world. There can be two versions of the 2D arrangement utilized by the process, one representing the 3D point cloud and the other representing a scalar depth values for each point. Depth maps, also referred to as depth buffers, z-buffers, z-buffering, or z-depths, are well understood in the graphics processing space. This difference can be demonstrated using a different sample test analysis as shown below in Table 1 where ms are milliseconds and μs are microseconds.

TABLE 1

Comparison between K-D and Depth Map ICP Analysis

| | K-d tree ICP | | | Depth map ICP | | |
|---|---|---|---|---|---|---|
| | Avg. | Min. | Max. | Avg. | Min. | Max |
| Normal computation (once per pair of spins) | 8.55 ms | 7.75 ms | 9.42 ms | 1.29 ms | 1.28 ms | 1.3 ms |
| Gathering data and setting up equation (6X per iteration) | 323.9 μs | 288.6 μs | 391.3 μs | 202.1 μs | 172.7 μs | 620.3 μs |

Using a rotating LiDAR as an example, as the LiDAR sensor rotates, it collects a slice of data at each rotational position. The incremental position change can be defined as an incremental value of the rotation. For example, a rotation angle of approximately 0.46° can be defined as a slice of collected data (see FIG. 3 as an example). Typically, the raw LiDAR data is approximately 0.11° which can be down sampled to 0.46°. This results in approximately 782.6 slices per full rotation of the LiDAR sensor. This example is a demonstration of one type of LiDAR system. Other LiDAR systems can have varying characteristics. One skilled in the art will understand that there are other factors used in this determination hence the approximation. Overlap of data points between slices of collected data can occur with movement of an object or the vehicle.

In some aspects, a bounded window, i.e., targeted area for processing within a slice, can be used. Bounded windows can be set to a determined size. Bounded window sizes can vary. For example, for use with a motion algorithm, a bounded window can be 13 pixels wide by 7 pixels high, while for other calculations, a bounded window can be 9 pixels wide by 5 pixels high. Other bounded window sizes can be utilized as well. In this case, a pixel is equivalent to a 3D data point. In an alternative aspect, if the LiDAR rotates at a faster speed than the 10 rotations per second described above, then the bounded window sizes can be multiplied by the same factor as the rotational speed increase to determine the new bounded window size. A smaller bounded window, since more windows are needed to cover the entire slice, can require more computations to complete than a larger bounded window size. A larger bounded window size can require a larger processing system to process the data defined by the bounded window.

Once the point cloud data has been reduced to a 2D depth map, the process can estimate the nearest neighbors to a given data point, as they are typically spatially proximate to that data point on the 2D depth map. The analysis does not need to traverse the universe of data points in the point cloud. This approach uses the bounded window on the 2D depth map, such that, regardless of the size of the point cloud data, a fixed number of nearby data points to a given data point, i.e., the origin or target data point, will be examined. This can reduce the computational complexity of finding the nearest neighbor to O(1), e.g., the computation time is constant no matter the size of the data. This can greatly decrease the time necessary to complete the nearest neighbor analysis.

In some aspects, GPUs can parallel process the data collected in each slice. In some aspects, parallel processing threads can share fetched neighbor data point data, where such neighbor data points are neighbors of more than one data point within the bounded window. This capability can increase the processing speed of the algorithms and computations. In some aspects, GPUs can fetch some, most, or, all of the data within a bounded window in one memory fetch call, where fetching a block of data can be more efficient for GPU parallel processing than fetching one data point at a time.

In another aspect, the point cloud data, such as from a slice, can be represented as a texture map within a GPU system. GPUs can have processing constructs, such as parallel processing hardware, and software constructs, to directly manipulate and analyze the texture map at a faster speed than using other methods. Additional GPU processing constructs can include, for example, a coherence of data and less branching. K-d tree and other tree type algorithms generally involve significant number of memory fetches to handle the tree traversals. GPU parallel processing is more efficient for block memory fetches and cache line processes. A conical data slice from a LiDAR system can be, for example, 870 pixels wide by 64 pixels high (870×64) in size. The texture map can also be 870×64 pixels.

In another aspect, an equi-angular depth can be used. This means that the angle of each slice is the same for each horizontal dimension and the same for each vertical dimension in the depth map representation (see FIG. 3, element 312 for an example angle). This can result in more efficient search starting points and can reduce the size of the bounded window. In an alternative aspect, the horizontal and vertical dimensions can also be the same or different from each other. Each rotation of the LiDAR sensor, in conjunction with motion, i.e., trajectory between two time points, can create an overlap of point cloud data points, which in turn can indicate movement of the vehicle or of an external object. Bounded window sizes can be affected by the angular separation. There can be a preference for the bounded window to be slightly wider than the height. For example, a width can be 1.2 to 1.4 times the height of a bounded window.

In another aspect, multiple slices of data can be utilized to provide additional analysis. For example, a moving object, depending on the object's motion vector compared to the vector of the vehicle, can be identified, along with the moving object's trajectory. An object can be detected in 2 different slices, either slices that are positionally different, or slices of the same geometric space that are collected during different rotations of the LiDAR system. By comparing the object's position relative to the vehicle, and factoring in the vehicle's own movement, the movement of the object can be detected.

In another aspect, planarization is an approach for improving the conversion of point cloud data to a depth map. A 3D point cloud dataset offers precise 3D coordinate information on every data point in the point cloud. When this data is mapped into a 2D depth map, where each data point corresponds to a conical region, some useful information can be degraded (see FIG. 4 as an example). Planarization can reduce the degradation by including a transitional step. Rather than mapping directly from point cloud data to a 2D depth map, point cloud data, i.e., 3D coordinates (x, y, z), are being mapped to a 3D polar depth map, i.e., polar coordinates (r, $\Theta$, $\Phi$). The collected 3D data points, collected by a detection and ranging sensor, such as a LiDAR or RADAR system, can be stored as the 3D polar depth map. These coordinates, for a LiDAR system, are defined as:
 x is to the left of the forward/origin position of the LiDAR system
 y is the forward depth as compared to the origin at the LiDAR system
 z is the upward position as compared to the origin at the LiDAR system
 r is the radial line
 $\Theta$ is the azimuth as measured from the plane containing the x and y directions of the LiDAR system and rotates in a clockwise motion
 $\Phi$ is the polar angle as measured from the forward position of the LiDAR system.

After completing the polar depth map transformation, plane detection is performed locally around each pixel on the data points in the 3D polar depth map. In another aspect, the LiDAR system can provide the raw point cloud data in a polar representation. In this scenario, a transformation may need to be made to a Euclidean coordinate system for certain processing steps. This can be implemented using a nearest neighbor analysis, and/or using size-limited windows into the space to increase performance. Using the geometry of the estimated plane, the correct depth for each data point in the depth map can be re-computed by intersecting the ray, associated with the nominal direction of the 2D position of the corresponding point in the depth map, with the plane for that particular data point. The resulting correct depth information can be stored in the 2D depth map. In some aspects, multiple data points can be associated with a plane thereby saving processing power and storage space since the defined plane can be used more than one time.

Turning now to the figures, FIG. 1 is an illustration of a diagram 100 of an example autonomous or semi-autonomous operated vehicle 115 in a real-world environment. Vehicle 115 can include a system processor 104, a LiDAR system 105a and 105b, and a RADAR system 110a and 110b. This example shows two LiDAR systems on the vehicle. In an alternative aspect, a single LiDAR system can be mounted on the vehicle, and in other aspects, multiple LiDAR systems can be mounted on the vehicle. The positioning of components on the vehicle is for demonstration purposes. Components 104, 105, and 110 can be mounted, included, or attached at various locations on the vehicle 115. LiDAR, and other system types, such as RADAR, can provide the mechanism to collect the point cloud data used for this disclosure.

In an example, LiDAR system 105a can emit its light source 117, and collect the resulting data points as the point cloud data. Vehicle 115 is on a roadway 120. The point cloud data can include data points representing different features and artifacts in the geometric space around the vehicle. In this example, a landmark detection is represented by a road sign 128, a freespace detection is represented by open space 124, and an object detection is represented by a second vehicle 126. These elements, 124, 126, and 128, are collectively referred to as the geometric space parameters. Building 122 can also be part of the geometric space parameters. In addition, the geometric space parameters include object trajectories and moving objects. These are the parameters of areas and objects around, or partially around, the LiDAR system 105a and are used in further processing systems.

Figure 2:
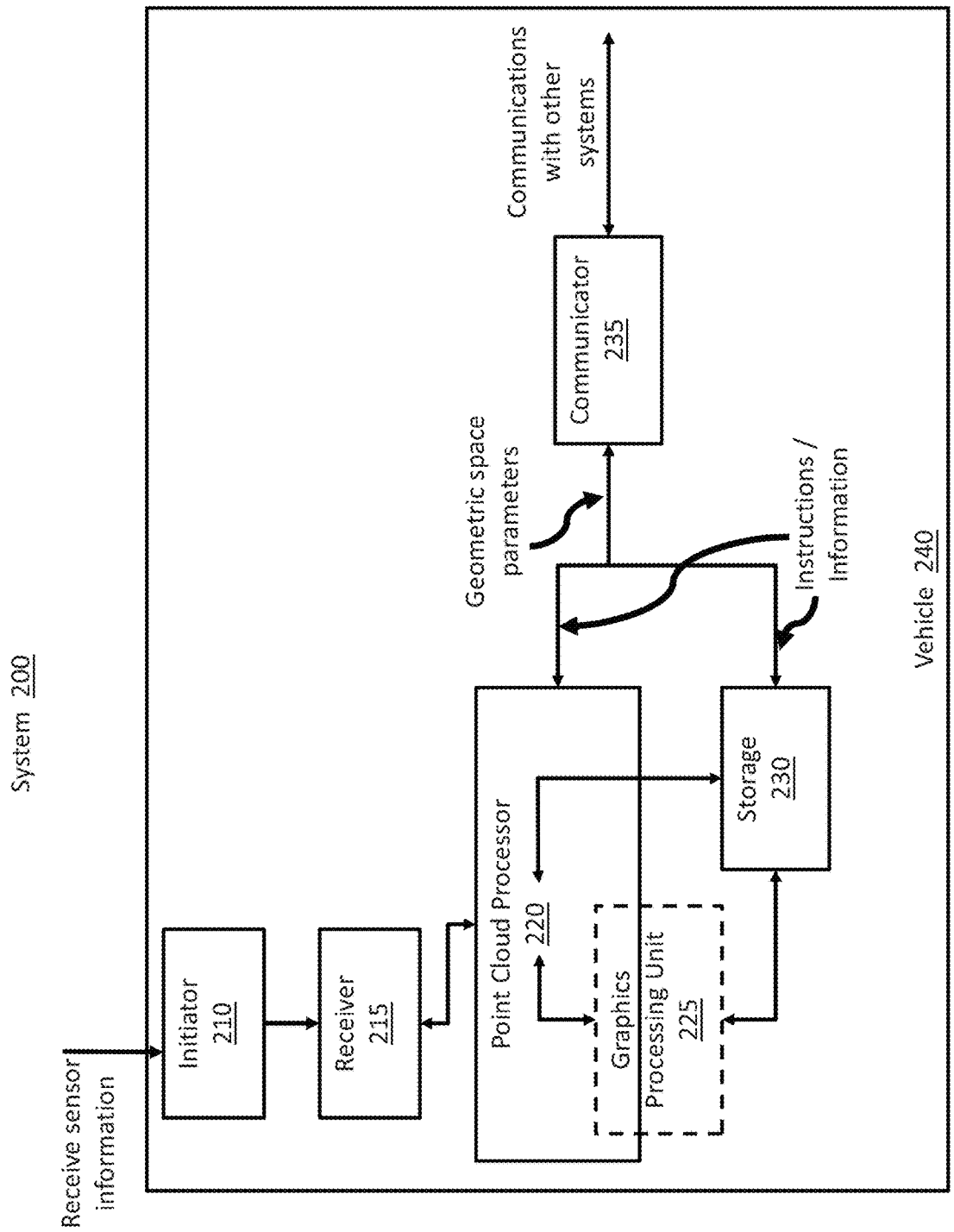
FIG. 2 is an illustration of a block diagram of an example depth map processing system.

FIG. 2 is an illustration of a block diagram of an example point cloud data analysis system 200 to analyze point cloud data. The system 200 comprises a point cloud data initiator 210 (hereinafter referred to as an initiator 210), a receiver 215, a point cloud processor 220, a GPU 225, storage 230, communicator 235, and vehicle 240. The initiator 210, such as a LiDAR system, collects the point cloud data at a periodic interval. In some applications, a RADAR system can be used as the initiator. It initiates the process that is used to identify and collect the data points in the geometric space surrounding, or partially surrounding, the vehicle 240. The initiator 210 communicates the collected data points, forming a point cloud, to the receiver 215. Receiver 215 can be a conventional interface, providing communications between the initiator 210 and the point cloud processor 220. The receiver 215 passes the data points to the point cloud processor 220. In addition, the point cloud processor 220 can communicate commands and instructions to receiver 215.

The point cloud processor 220 processes, transforms, analyzes, and calculates parameters from the received data points. The point cloud processor 220 can be one or more processors located proximate or separate from each other. GPU 225 is shown with a dashed line indicating that GPU 225 is optional and can be part of point cloud processor 220, it can be wholly point cloud processor 220, and GPU 225 can be a separate component communicatively connected to point cloud processor 220. GPU 225, working in conjunction with point cloud processor 220, performs the transformations, such as generating the 2D depth maps and texture maps, determinations, such as the trajectory equations, analysis, and generates the resulting geometric space parameters that are then communicated to other systems through communicator 235.

The collected point cloud data, transformations, intermediate calculations, such as depth maps, texture maps, and other intermediate and final data and information can be stored in storage 230. Storage 230 can be a conventional storage medium, such as local memory, other memory, a database, hard drive, buffer, and other storage types. Communicator 235 can also receive requests, commands, and instructions from other systems, for example navigation and mapping systems, safety systems, collision avoidance systems, and other vehicle systems. In addition, communicator 235 can send communications to point cloud processor 220 and storage 230. For example, a command can be received that the depth map transformations should change from an average parameter calculation to a minimum parameter calculation. The communicator 235 can be a conventional interface for communicating data and instructions to and from other systems and sub-systems related to the vehicle 240, other data storage areas, and devices.

The initiator 210, receiver 215, point cloud processor 220, GPU 225, storage 230, and communicator 235 can be included as part of vehicle 240, can be attached to vehicle 240, be proximate to vehicle 240, be separate and communicatively coupled to other systems in vehicle 240, and other combinations, such as some of the components attached to vehicle 240 and other components located separately. The components described herein are a functional view of the components. Each component can be combined or separated from the other components. For example, the point cloud processor 220 can include receiver 215 and communicator 235.

Figure 3:
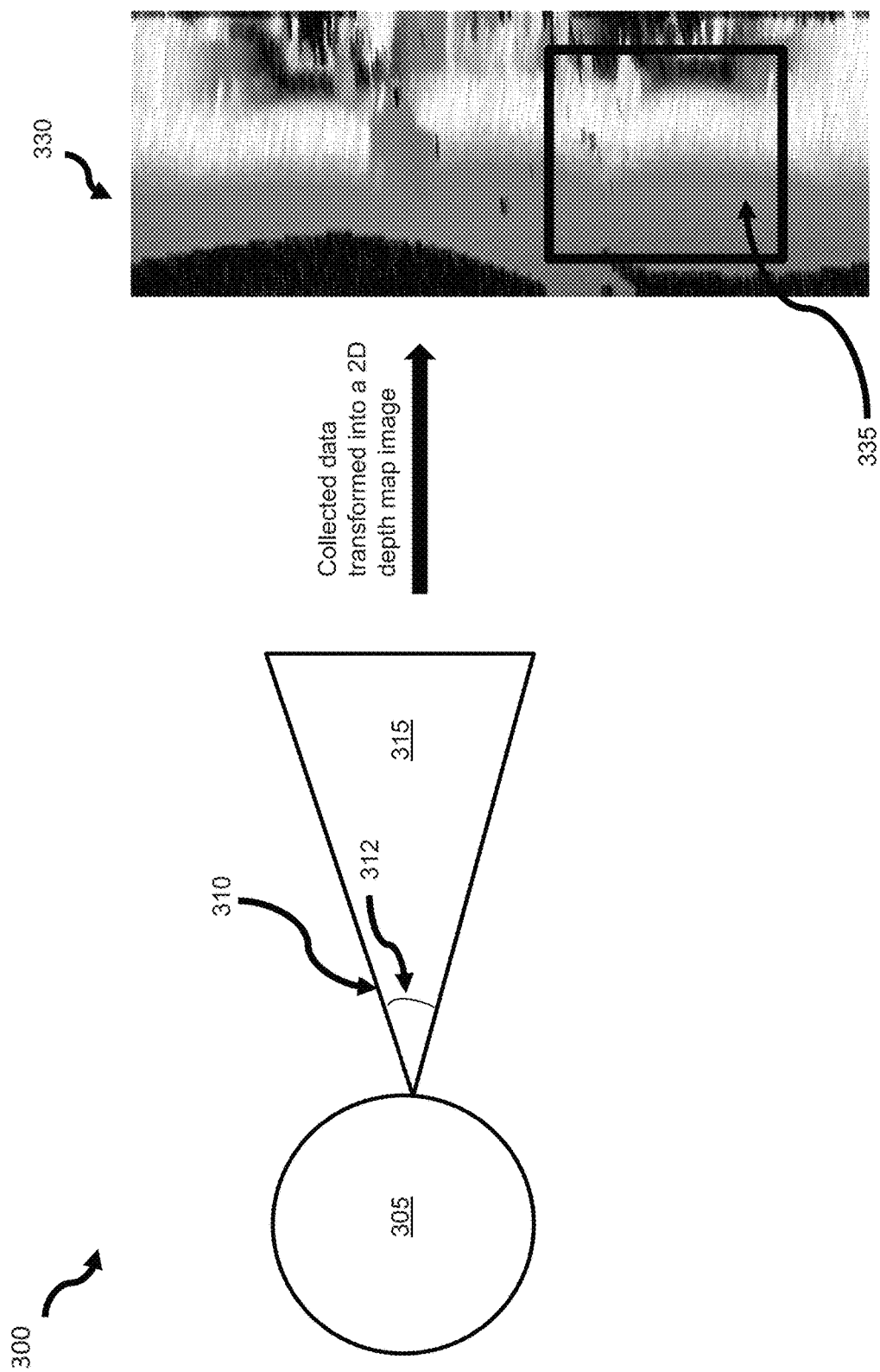
FIG. 3 is an illustration of a diagram of an example LiDAR system utilizing a slice of point cloud data.

FIG. 3 is an illustration of a block diagram 300 of an example LiDAR system utilizing a 0.46° slice of point cloud data. Diagram 300 also shows a transformation of the point cloud data into a portion of a depth map that includes a bounded window. The LiDAR system comprises a system controller and processor (not shown), as well as a rotating component, LiDAR sensor 305, capable of emitting and receiving light waves, such as from a laser. The data collected by the LiDAR sensor 305 is divided into slices. The slices, represented by slice 310, can be defined at various sizes, and for this example the slice 310 is 0.46° (element 312) of the rotation of the LiDAR sensor 305. This equates to approximately 281 data points per slice 310. One skilled in the art will understand that this number is not an exact figure and the actual number of data points can be lower or higher due to factors, such as the LiDAR sensor specifications, the rotation speed, resolution of the sensor, and other factors. The slice 310 forms a conical area 315 extending from the LiDAR sensor 305. The resulting data points collected within this slice 310 can be transformed into a depth map 330 and stored in a storage area.

In other aspects, the data points from the slice 310 can be transformed to a texture map or can be transformed to a polar depth map. In other aspects, a bounded window 335 can be determined and overlaid on the depth map 330 so that a portion of the depth map can be analyzed utilizing that bounded window 335. GPUs can be efficient at retrieving a block of data and parallel processing that block. The bounded window 335 defines that block of data that the GPU can process. In some aspects, each point within the bounded window 335 can be processed in parallel, meaning that a nearest neighbor analysis is performed in parallel. In some aspects, the parallel processing can include sharing data among the parallel processing threads to reduce data point fetching overhead.

FIGS. 4A, 4B, 4C, and 4D illustrate diagrams 400-403 of an example depth map noise depiction. Diagrams 400-403 demonstrate that when summarizing data points, some data point fidelity, i.e., precision, is lost. Nearby points can be located at a depth different than their actual depth, wherein depth is the distance from the LiDAR system generating the data points. Diagram 400 in FIG. 4A, illustrates a LiDAR system 410, and two small objects 412 and 414 lying on a surface 405. When rendered as point cloud data (maintaining 3D point representation), the precise location information for these small objects is preserved. When mapping point cloud data into a 2D depth map, the point cloud data is transformed. Rather than precise coordinates for objects 412 and 414, the depth map translates object location information to corresponding data points in the 2D depth map. This mapping involves conical regions, as shown in diagram 401 in FIG. 4B as example regions 420, 422, and 424. These conical regions 420, 422, 424, intersect the road surface 405. Regions 420 and 424 include portions of objects 412 and 414. There can be one or more conical regions defined within the point cloud data region.

When the 2D depth map is created, which includes recording the distance from the LiDAR system 410 for each data point in the depth map, a single value can be recorded for each of the conical regions 420, 422, and 424, essentially summarizing the data points falling within that region. The value representation is demonstrated by the simplified depth map 402 shown in FIG. 4C. The recorded values are illustrated in the depth map 402 by data point 430 corresponding to conical area 420, data point 432 corresponding to conical area 422, and data point 434 corresponding to conical area 424. The single value recorded can be an average for the information in each region, the closest point, i.e., minimum value, in each region, or another representative value.

Transforming the data points from the 2D depth map back to a 3D point representation can create data noise. Rather than detecting a smooth surface with 2 objects lying on it, transforming the data yields a ridged surface, as shown in diagram 403 in FIG. 4D. Every surface point, within their respective regions 420 and 424, is treated as being the same distance from the LiDAR system 410. Such distance is shown, by example, as line 426 in conical region 420 and line 427 in conical region 424. It may or may not be the case where the original data points are actually at the same distance. Since there is one parameter available, a point in the conical region can be chosen for the transformation process. For example, one point can be chosen utilizing a selection criterion such as nearest point and mean distance to origin criteria. Typically, a ray that goes through the center of a conical region, can be chosen during the transformation process. This can result in a 3D point that is not necessarily at the correct depth. An average parameter, using the data points, can be calculated and used to create the line 426 and line 427, as the average parameter can tend to create a smoother plane. Using a minimum parameter to create line 426 and line 427 can be used in certain circumstances, such as if certain comparisons need to be made, as the minimum parameter retains higher frequency information.

FIG. 5 is an illustration of a flow diagram of an example method 500 for analyzing collected data points. At least some of the steps of the method 500 can be performed by a GPU, such as the GPU 225 in FIG. 2. The method 500 starts at step S01 and proceeds to a step 505 where a system of some type, such as LiDAR and RADAR, collects data points at a periodic interval, such as with a rotating LiDAR sensor rotating at 10 revolutions per second. The data points are communicated and received by a processing system or processor. From step 505, the method can proceed to a step 510 where the nearest neighbor analysis can be processed on the collected data points. Proceeding to a step 515, trajectory equations can be estimated from the preceding analysis.

Proceeding to a step 525, the data points are analyzed utilizing the trajectory equations. The method 500 ends at a step 550.

FIG. 6 is an illustration of a flow diagram of an example method 600 that expands on the method 500. At least some of the steps of the method 500 can be performed by a GPU, such as the GPU 225 in FIG. 2. The method 600 starts at step 601 and proceeds to a step 605 where a system of some type, such as LiDAR and RADAR, collects data points. From step 605, the method 600 proceeds to the step 505 as described above. Proceeding from step 505, the method 600 can follow option 1*a* or option 1*b*. Following option 1*a*, the method 600 proceeds to a step 610 where the collected data points are stored as a 2D depth map. Proceeding to a step 612 the system, such as a GPU, can process the data in the 2D depth map using parallel processing threads.

From step 612, the method 600 can proceed via option 2*a* to the similar step 510 as described above or via option 2*b* to a step 619. Step 619 defines a bounded window to analyze part of the depth map using the bounded window as a constraint. This can be useful when using a GPU since that type of system can process a block of data quickly while using parallel processing threads. Proceeding from step 619, or from option 2*a*, the method 600 proceeds to the step 515 as described above.

Returning to option 1*b* from step 505, the method 600 can proceed to the step 615 where the collected data points are stored as texture map, rather than using a depth map. Proceeding to a step 617, a GPU system can be used to process the texture map. GPU systems can have constructs that allow them to process texture maps more efficiently than non GPU systems. From step 617, method 600 proceeds to the step 510.

In the step 510, a nearest neighbor analysis is conducted on one or more of the data points. This can be a version of the ICP algorithm, modified to use a depth map or a texture map on a GPU with parallel processing. In some applications, another algorithm can be used. Proceeding to a step 515, trajectory equations can be deduced from the data analysis and nearest neighbor analysis. Proceeding to a step 630, moving objects can be calculated utilizing the trajectory equations. This can identify that the vehicle is moving, that a separate object is moving, or both situations are occurring. It can identify the vector of the moving object. In other aspects, other parameters can be calculated, such as freespace detection, obstacle detection, landmark detection, and localization. Proceeding to a step 635, the results can be communicated to other processing systems for further analysis and decisions. The method 600 ends at a step 660.

The above-described apparatuses, systems or methods or at least a portion thereof may be embodied in or performed by various processors, such as digital data processors or computers, including cloud computing systems and servers, wherein the processors are programmed or store executable programs or sequences of software instructions to perform one or more of the steps of the methods or functions of the apparatuses or systems. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers, including cloud computing systems and servers, to perform one, multiple or all of the steps of one or more of the above-described methods or functions of the system described herein.

Certain embodiments disclosed herein may further relate to computer storage products with a non-transitory computer-readable medium that have program code thereon for performing various computer-implemented operations that embody at least part of the apparatuses, the systems or carry out or direct at least some of the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described aspects. It is also to be understood that the terminology used herein is for the purpose of describing particular aspects only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

What is claimed is:

1. A method of analyzing data points in a point cloud system, comprising:
    receiving three dimensional (3D) point cloud data points;
    transforming the received 3D point cloud data points to a two dimensional (2D) depth map or a texture map;
    determining a neighbor data point that is nearest to each of said transformed 3D point cloud data points from a group of said transformed 3D point cloud data points within a bounded window of said 2D depth map or said texture map; and
    estimating trajectory equations utilizing said neighbor data point that is nearest to each of said transformed 3D point cloud data points and said received 3D point cloud data points.

2. The method as recited in claim 1, further comprising:
    storing said 2D depth map; and
    wherein said estimating utilizes said stored 2D depth map.

3. The method as recited in claim 1, further comprising:
    storing said texture map; and
    wherein said estimating utilizes said stored texture map.

4. The method as recited in claim 1, further comprising:
    utilizing a LiDAR system to generate, at a periodic interval, slices of said received 3D point cloud data points; and
    wherein said 3D point cloud data points represent part of a geometric space of a vehicle.

5. The method as recited in claim 4, wherein said vehicle is an autonomous or semi-autonomous vehicle.

6. The method as recited in claim 4, further comprising:
    utilizing said slices; and
    wherein said determining, and said estimating are executed for each of said slices.

7. The method as recited in claim 6, further comprising:
    storing each of said slices as a portion of said 2D depth map; and
    utilizing, for each of said slices, a first angle parameter for a horizontal dimension of said each slice, and a second angle parameter for a vertical dimension of said each slice, wherein said first angle parameter is equivalent for each of said slices analyzed and said second angle parameter is equivalent for each of said slices analyzed.

8. The method as recited in claim 1, wherein said determining said neighbor data point is performed on a graphics processing unit (GPU).

9. The method as recited in claim 1, wherein said bounded window includes a fixed number of said neighbor data points.

10. The method as recited in claim 9, wherein said bounded window is 13 pixels wide by 7 pixels high.

11. The method as recited in claim 9, wherein said bounded window is 9 pixels wide and 5 pixels high.

12. The method as recited in claim 9, wherein a separate GPU processing thread is spawned for each of said transformed 3D point cloud data points within said bounded window, and where some of said processing threads share fetched data.

13. The method as recited in claim 1, further comprising:
    calculating moving object parameters utilizing said trajectory equations.

14. The method as recited in claim 1, further comprising:
    generating, utilizing said trajectory equations, at least one geometric space parameter for at least one of obstacle detection, freespace detection, and landmark detection.

15. A point cloud data analysis system to generate geometric space parameters, comprising:
    a receiver, operable to receive three dimensional (3D) point cloud data points representative of part of a geometric space surrounding a vehicle; and
    a graphics processing unit (GPU) operable to transform said received 3D point cloud data points to at least one of a two dimensional (2D) depth map and a texture map, to determine a neighbor data point that is nearest to each of said transformed 3D point cloud data points from a group of said transformed 3D point cloud data points within a bounded window of said 2D depth map or said texture map, and to generate said geometric space parameters.

16. The system as recited in claim 15, further comprising:
    an initiator, operable to initiate a generation of said 3D point cloud data points at a periodic interval.

17. The system as recited in claim 16, wherein said initiator is a LiDAR system.

18. The system as recited in claim 15, wherein said vehicle is one of an autonomous vehicle and a semi-autonomous vehicle.

19. The system as recited in claim 15, wherein said geometric space parameters are associated with at least one of a moving object, obstacle detection, freespace detection, and landmark detection.

20. A computer program product having a series of operating instructions stored on a non-transitory computer-readable medium that directs a data processing apparatus, when executed thereby, to perform operations comprising:
   receiving three dimensional (3D) point cloud data points, at a periodic interval, representative of part of a geometric space surrounding a vehicle;
   transforming said received 3D point cloud data points to a two dimensional (2D) depth map or a texture map;
   determining a neighbor data point that is nearest to each of said transformed 3D point cloud data points from a group of said transformed 3D point cloud data points within a bounded window of said 2D depth map or said texture map; and
   estimating trajectory equations for said vehicle utilizing said neighbor data point that is nearest to each of said transformed 3D point cloud data points.

21. The computer program product as recited in claim 20, wherein said determining is performed utilizing a graphics processing unit (GPU).

22. The computer program product as recited in claim 20, wherein said bounded window includes a fixed number of said neighbor data points.

23. The computer program product as recited in claim 20, further comprising:
   generating, utilizing said trajectory equations, at least one geometric space parameter for at least one of moving object detection, obstacle detection, freespace detection, and landmark detection.

24. The computer program product as recited in claim 20, further comprising:
   utilizing said periodic intervals; and
   wherein said receiving, said determining, and said estimating, are executed for each of said periodic intervals.

25. A method of storing three dimensional (3D) sensor ranging information, comprising:
   collecting 3D point cloud data points employing a detection and ranging sensor;
   storing said collected 3D point cloud data points as a two dimensional (2D) depth map; and
   determining a neighbor data point that is nearest to each of said stored 3D point cloud data points from a group of said stored 3D point cloud data points within a bounded window of said 2D depth map.

* * * * *

UNITED STATES PATENT AND TRADEMARK OFFICE
CERTIFICATE OF CORRECTION

PATENT NO. : 10,776,983 B2
APPLICATION NO. : 16/051263
DATED : September 15, 2020
INVENTOR(S) : Ishwar Kulkarni et al.

It is certified that error appears in the above-identified patent and that said Letters Patent is hereby corrected as shown below:

In the Specification

In Column 11, Line 59, after --at step-- delete "S01" and insert --501--

Signed and Sealed this
Tenth Day of November, 2020

Andrei Iancu
*Director of the United States Patent and Trademark Office*